US012563347B2

(12) United States Patent
Joet et al.

(10) Patent No.: US 12,563,347 B2
(45) Date of Patent: Feb. 24, 2026

(54) ELECTROMECHANICAL SYSTEM COMPRISING CAPACITIVE MEASUREMENT OR ACTUATION MEANS AND A TRANSMISSION SHAFT

(71) Applicant: COMMISSARIAT À L'ENERGIE ATOMIQUE ET AUX ENERGIES ALTERNATIVES, Paris (FR)

(72) Inventors: Loïc Joet, Grenoble (FR); Samer Dagher, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 197 days.

(21) Appl. No.: 18/400,737

(22) Filed: Dec. 29, 2023

(65) Prior Publication Data

US 2024/0223968 A1 Jul. 4, 2024

(30) Foreign Application Priority Data

Dec. 30, 2022 (FR) ....................................... 2214688

(51) Int. Cl.
*H04R 19/04* (2006.01)
*H04R 19/02* (2006.01)

(52) U.S. Cl.
CPC ............. *H04R 19/04* (2013.01); *H04R 19/02* (2013.01); *H04R 2201/003* (2013.01); *H04R 2400/11* (2013.01)

(58) Field of Classification Search
CPC .. H04R 19/04; H04R 19/02; H04R 2201/003; H04R 2400/11
See application file for complete search history.

(56) References Cited

U.S. PATENT DOCUMENTS 10,771,902 B1 * 9/2020 Ryu ..................... H10N 30/206
2004/0008853 A1 * 1/2004 Pelrine .................. F16F 15/005
381/191

(Continued)

FOREIGN PATENT DOCUMENTS

EP 3 975 588 A1 3/2022
FR 3 059 659 B1 5/2019

(Continued)

OTHER PUBLICATIONS

Search Report as issued in French Patent Application No. FR2214687, dated Jul. 24, 2023.

(Continued)

*Primary Examiner* — Suhan Ni
(74) *Attorney, Agent, or Firm* — Pillsbury Winthrop Shaw Pittman LLP

(57) ABSTRACT

An electromechanical system includes a frame; a movable element; a capacitive measurement or actuation system including a first movable electrode and at least one electrode separated from the first movable electrode by a first dielectric medium; a first transmission device for transmitting movement between the movable element and the first movable electrode, the first transmission device being rotatably movable relative to the frame by a plurality of first pivot hinges; the first transmission device including a first transmission shaft having a first longitudinal axis of rotation; and a plurality of first transmission arms, each of the first transmission arms including a first end coupled to the movable element and a second end secured to the first transmission shaft; the first movable electrode being connected to the first transmission shaft.

19 Claims, 10 Drawing Sheets

(56) References Cited

U.S. PATENT DOCUMENTS

| | | | | |
|---|---|---|---|---|
| 2021/0021919 | A1* | 1/2021 | Nakagawa | G04B 19/24 |
| 2021/0021944 | A1* | 1/2021 | Joet | H04R 17/02 |

FOREIGN PATENT DOCUMENTS

| | | | |
|---|---|---|---|
| FR | 3 114 584 | B1 | 9/2022 |
| WO | WO 2008/078182 | A2 | 7/2008 |

OTHER PUBLICATIONS

Search Report as issued in French Patent Application No. FR2214688, dated Jul. 21, 2023.

* cited by examiner

ELECTROMECHANICAL SYSTEM COMPRISING CAPACITIVE MEASUREMENT OR ACTUATION MEANS AND A TRANSMISSION SHAFT

CROSS-REFERENCE TO RELATED APPLICATIONS

This application claims priority to French Patent Application No. 2214688, filed Dec. 30, 2022, the entire content of which is incorporated herein by reference in its entirety.

FIELD

The technical field of the invention is that of electromechanical systems, especially of the microelectromechanical systems (MEMS) or nanoelectromechanical systems (NEMS) type. The invention more particularly relates to an electromechanical system comprising a movable element, capacitive measurement or actuation means and a device for transmitting movement between the movable element and the capacitive measurement or actuation means. Such a system may be employed as an electroacoustic transducer (for example microphone, loudspeaker . . . ) or as a differential pressure sensor.

BACKGROUND

Microelectromechanical or nanoelectromechanical microphones represent a rapidly expanding market, especially due to the development of nomadic devices, such as tablets, smartphones and other connected objects, in which they are gradually replacing electret microphones.

Microphones measure a rapid variation in atmospheric pressure, also known as acoustic pressure. Therefore they include at least one part in contact with the outside.

Most MEMS or NEMS microphones manufactured today are capacitive detection microphones. FIG. 1 represents one example of a capacitive detection microphone 1, described in patent FR3114584B1.

The microphone 1 comprises a frame (not represented) at least partly defining a first zone 11 and a second zone 12, an element 13 movable relative to the frame and a device 14 for transmitting movement between the first zone 11 and the second zone 12. The first and second zones 11-12 of the microphone 1 are sealingly insulated from each other.

The movable element 13, also called piston, is in contact with the first zone 11. It comprises a membrane 131 and a membrane rigidifying structure 132. The role of the membrane 131 of the piston 13 is to collect over its entire surface a pressure difference between its two faces, in order to deduce a variation in atmospheric pressure therefrom. One side of the membrane 131 is subjected to atmospheric pressure (the variation of which is desired to be detected) and an opposite side of the membrane 131 is subjected to a reference pressure.

In addition, the microphone 1 comprises capacitive detection means 15 disposed in the second zone 12. These capacitive detection means 15 allow measurement of the displacement of the piston 13, and therefore the difference in pressure between its two faces. They preferably comprise a movable electrode 151 and at least one fixed electrode facing the movable electrode 151. The electrodes form armatures of a capacitor whose capacitance varies as a function of the displacement of the piston 13.

The transmission device 14 is rotatably mounted relative to the frame by means of several pivot hinges 16. The transmission device 14 comprises two first transmission arms 141 extending in the first zone 11, two second transmission arms 142 extending in the second zone 12 and two transmission shafts 143 partly extending in the first zone 11 and partly in the second zone 12. Each transmission shaft 143 connects a first transmission arm 141 to a second transmission arm 142.

Each first transmission arm 141 comprises a first end coupled to the piston 13 and a second, opposite end coupled to the transmission shaft 143 associated therewith. Each second transmission arm 142 comprises a first end coupled to the movable electrode 151 of the capacitive detection means 15 and a second, opposite end coupled to the transmission shaft 143 associated therewith.

Patent FR3059659B1 describes a capacitive detection microphone similar to that of FIG. 1. The capacitive detection means comprise a movable electrode and two fixed electrodes between which the movable electrode is disposed. The electrodes form armatures of two capacitors whose capacitances vary in opposite directions as a function of the displacement of the piston. The measurement of the piston displacement is therefore a differential measurement.

To achieve such a differential measurement, the capacitors are charged beforehand by applying a DC bias voltage between the movable electrode and the fixed electrodes through a high resistance. Displacement of the piston results in a variation in capacitance, and hence a variation in voltage between the fixed electrodes (the capacitor charge being substantially constant at audible frequencies, typically above 100 Hz) which can be read by an instrumentation amplifier.

One drawback of these capacitive detection microphones is that energy is lost in the deformation of the transmission device 14 and the frame of the movable electrode 151, which represents a loss of useful signal upon detecting dynamic pressure variations.

In addition, these capacitive detection microphones can become failing due to a movable electrode "pull-in" phenomenon, which is common to all electromechanical systems that include capacitive measurement or actuation means. This pull-in phenomenon is caused by the electrostatic force, which tends to bring the movable electrode closer to the fixed electrode (or to one of the fixed electrodes) and which depends on the square of the bias voltage. The electrostatic force, which also depends on the displacement of the movable electrode, can be approximated to first order by a constant force plus the force exerted by a spring of negative stiffness for small displacements.

To avoid (to a certain extent) this pull-in phenomenon, an elastic force is opposed to the electrostatic force. This elastic force can be generated by springs that connect the frame of the movable electrode to the microphone frame. The greater the stiffness of the springs, the greater the voltage at which the electrostatic force overcomes the elastic force (the so-called "pull-in voltage") and the higher the voltage at which the movable electrode 151 can be biased. This is advantageous because the sensitivity of the microphone 1 increases with the bias voltage).

The sensitivity of the microphone 1 also increases with the displacement of the movable electrode 151. One solution to increase displacement of the movable electrode 151 would be to increase displacement of the piston 13 (also called compliance) but this is limited by the resonant frequency of the microphone 1 (which is desired to be at least 35 kHz). Another solution is to reduce length of the first transmission arms 141 and/or increase length of the second transmission arms 142, thereby increasing the lever arm effect. However, it is difficult to reduce length of the first transmission arms 141, because there is a sealing zone around the capacitive detection means 15 to enclose them in the second zone 12 and because this would mean reducing the surface area of the piston 13. Increasing the length of the second transmission arms 142 is easier, but significantly increases the microphone overall size. Furthermore, simply increasing length of the second transmission arms 142 makes them more easily deformable, which ultimately reduces displacement of the movable electrode and decreases sensitivity.

SUMMARY

There is therefore a need to provide an electromechanical system with capacitive detection or actuation that is both compact and has high sensitivity.

According to an aspect of the invention, this need tends to be satisfied by providing an electromechanical system comprising:

- a frame;
- an element movable relative to the frame;
- a capacitive measurement or actuation system comprising:
  - a first electrode movable relative to the frame; and
  - at least one electrode fixed relative to the frame and separated from the first movable electrode by a first dielectric medium;
- a first transmission device for transmitting movement between the movable element and the first movable electrode, the first transmission device being rotatably movable relative to the frame by means of a plurality of first pivot hinges;

the first transmission device comprising:

- a first transmission shaft having a first longitudinal axis of rotation; and
- a plurality of first transmission arms, each of the first transmission arms comprising a first end coupled to a first half of the movable element and a second end secured to the first transmission shaft;

the first movable electrode being connected to the first transmission shaft.

Thus, when the movable element is displaced, it rotatably drives the first transmission device about the first longitudinal axis, which in turn moves the first movable electrode. This arrangement makes it possible to obtain a greater displacement of the movable electrode for a given displacement of the movable element, without however increasing the overall size of the electromechanical system, because the displacement of the movable electrode is now uncorrelated with the distance between the movable element and the movable electrode. It now depends on the distance between the first end of the first transmission arms and the first longitudinal axis of rotation. The electromechanical system according to an aspect of the invention thus has better compromise between sensitivity and compactness than the microphone of prior art.

Beneficially, the first movable electrode is secured to the first transmission shaft, resulting in that the first movable electrode is rotatably mounted about the first longitudinal axis of rotation.

In an embodiment:

- the capacitive measurement or actuation system further comprises:
  - a second electrode movable relative to the frame; and
  - at least one additional electrode that is fixed relative to the frame and separated from the second movable electrode by a second dielectric medium;
- the system further comprises a second transmission device for transmitting movement between the movable element and the second movable electrode, the second transmission device being rotatably movable relative to the frame by means of a plurality of second pivot hinges and comprising:
  - a second transmission shaft having a second longitudinal axis of rotation; and
  - a plurality of second transmission arms, each of the second transmission arms comprising a first end coupled to the movable element and a second end secured to the second transmission shaft;
- the second movable electrode is connected to the second transmission shaft.

According to one development of this embodiment, the second movable electrode is secured to the second transmission shaft, resulting in that the second movable electrode is movably rotatably mounted about the second longitudinal axis of rotation.

In one further development compatible with the previous one, the first longitudinal axis of rotation is parallel to the second longitudinal axis of rotation.

According to one further development compatible with the previous ones, the first end of the first transmission arms is coupled to a first half of the movable element and the first end of the second transmission arms is coupled to a second half of the movable element.

In an embodiment, the movable element is in contact with a first zone and the first and second movable electrodes are located in a second zone sealingly insulated from the first zone.

Further to the characteristics just discussed in the preceding paragraphs, the electromechanical system according to an aspect of the invention may have one or more of the following additional characteristics, considered individually or according to any technically possible combinations:

- the movable element is translating relative to the frame;
- the movable element is rotating relative to the frame;
- at least one of the first pivot hinges is located at the first movable electrode and another of the first pivot hinges is located at an end of the first transmission shaft opposite to the first movable electrode;
- at least one of the second pivot hinges is located at the second movable electrode and another of the second pivot hinges is located at an end of the second transmission shaft opposite to the second movable electrode;
- the first transmission arms extend perpendicularly to the first longitudinal axis of rotation;
- the second transmission arms extend perpendicularly to the second longitudinal axis of rotation;
- the first longitudinal axis of rotation is parallel to the second longitudinal axis of rotation;
- the first movable electrode and the second movable electrode are symmetrical with respect to a plane separating the first and second halves of the movable element;
- the first transmission device and the second transmission device are symmetrical with respect to a plane separating the first and second halves of the movable element;
- the first end of each first transmission arm is located at a distance $L_{pist1}$ from the first longitudinal axis of rotation such that:

$$\frac{1}{2} \times L_{elec1} \leq L_{pist1} \leq 2 \times L_{elec1}$$

where $L_{elec1}$ is the distance between a longitudinal edge of the first movable electrode and the first longitudinal axis of rotation;

the first end of each second transmission arm is located at a distance $L_{pist2}$ from the second longitudinal axis of rotation such that:

$$\frac{1}{2} \times L_{elec2} \leq L_{pist2} \leq 2 \times L_{elec2}$$

where $L_{elec2}$ is the distance between a longitudinal edge of the second movable electrode and the second longitudinal axis of rotation;

at least one part of the first transmission shaft located opposite to the movable element is perforated;

at least one part of the second transmission shaft located opposite to the movable element is perforated;

the first transmission shaft and the first transmission arms extend in the first zone and the first transmission device further comprises pillars extending partly in the first zone and partly in the second zone;

the second transmission shaft and the second transmission arms extend in the first zone and the second transmission device further comprises pillars extending partly in the first zone and partly in the second zone;

the first transmission shaft and the first transmission arms have a thickness of between 5 μm and 800 μm, such as between 50 μm and 200 μm;

the second transmission shaft and the second transmission arms have a thickness of between 5 μm and 800 μm, such as between 50 μm and 200 μm;

the first movable electrode comprises a membrane and a membrane rigidifying structure;

the rigidifying structure of the first movable electrode is anchored to the first transmission device at a part of the first pivot hinges;

the rigidifying structure of the first movable electrode comprises a plurality of beams extending in parallel to each other and at least some of the beams are anchored to the first transmission device, each beam of the at least one part being anchored to a first pivot hinge corresponding to the beam;

each first pivot hinge of the at least one part comprises a sealed insulation element capable of elastic deformation and ensuring sealing between the first zone and the second zone;

the second movable electrode comprises a membrane and a membrane rigidifying structure;

the rigidifying structure of the second movable electrode is anchored to the second transmission device at a part of the second pivot hinges;

the rigidifying structure of the second movable electrode comprises a plurality of beams extending in parallel to each other and at least some of the beams are anchored to the second transmission device, each beam of the at least one part being anchored to a second pivot hinge corresponding to the beam;

each second pivot hinge of the at least one part comprises a sealed insulation element capable of elastic deformation and ensuring sealing between the first zone and the second zone;

the capacitive measurement or actuation system comprises first and second fixed electrodes associated with the first movable electrode, the first movable electrode comprising a membrane disposed between the first and second fixed electrodes;

each of the first and second fixed electrodes comprises a first portion and a second portion located on either side of the membrane and on either side of the first pivot hinges, the first and second portions being electrically connected;

the capacitive measurement or actuation system further comprises third and fourth fixed electrodes associated with the second movable electrode, the second movable electrode comprising a membrane disposed between the third and fourth fixed electrodes; and each of the third and fourth fixed electrodes comprises a first portion and a second portion located on either side of the membrane and either side of the second pivot hinges, the first and second portions being electrically connected.

BRIEF DESCRIPTION OF THE FIGURES

Further characteristics and benefits of the invention will become apparent from the description given below, by way of indicating and in no way limiting purposes, with reference to the appended figures, in which.

For the sake of clarity, identical or similar elements are marked with identical reference signs throughout the figures.

DETAILED DESCRIPTION

Figure 1:
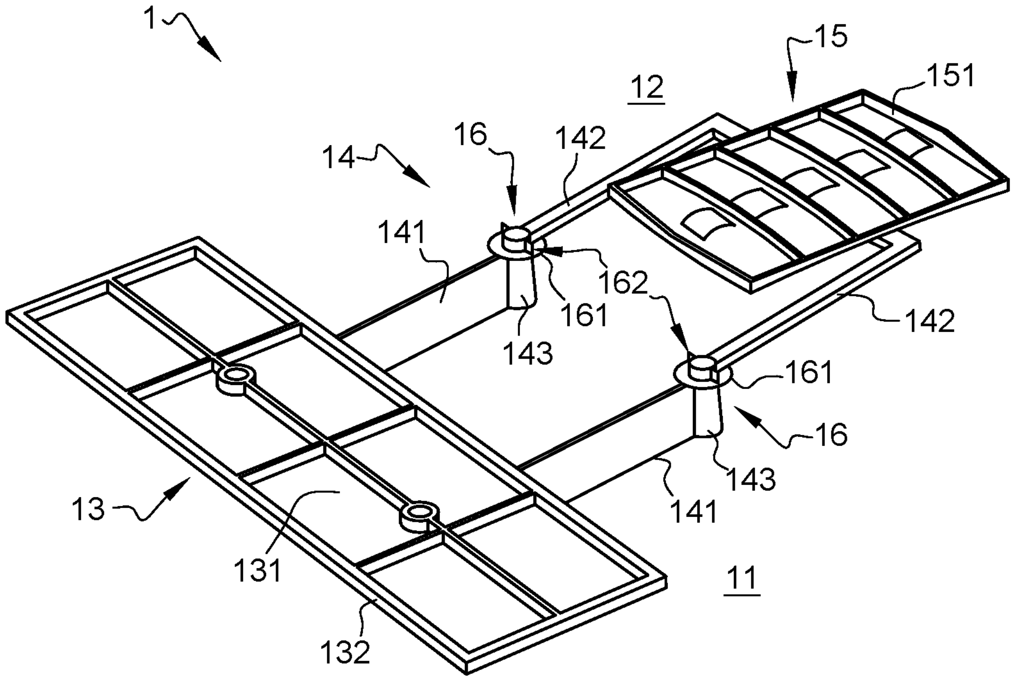
FIG. 1 is a partial perspective view of a capacitive detection microphone according to prior art.

FIGS. 2, 3 and 4A to 4C represent part of an electromechanical system 2 with capacitive detection or capacitive actuation according to a first embodiment of the invention. This electromechanical system 2 may form an electroacoustic transducer, for example a microphone or a loudspeaker, or a differential pressure sensor. In the following description, the example of a microphone with capacitive detection will be considered.

The electromechanical system 2 comprises:

a frame 10;

a movable element 13 in contact with a first zone 11;

capacitive detection (or measurement) system 15' comprising a first electrode 151 movable relative to the frame 10, a second electrode 152 movable relative to the frame 10, the first and second movable electrodes 151-152 being located in a second zone 12 sealingly insulated from the first zone 11; and a first transmission device 14*a* for transmitting movement between the movable element 13 and the first movable electrode 151 (in other words between the first zone 11 and the second zone 12); and a second transmission device 14*b* for transmitting movement between the movable element 13 and the second movable electrode 152.

Figure 2:
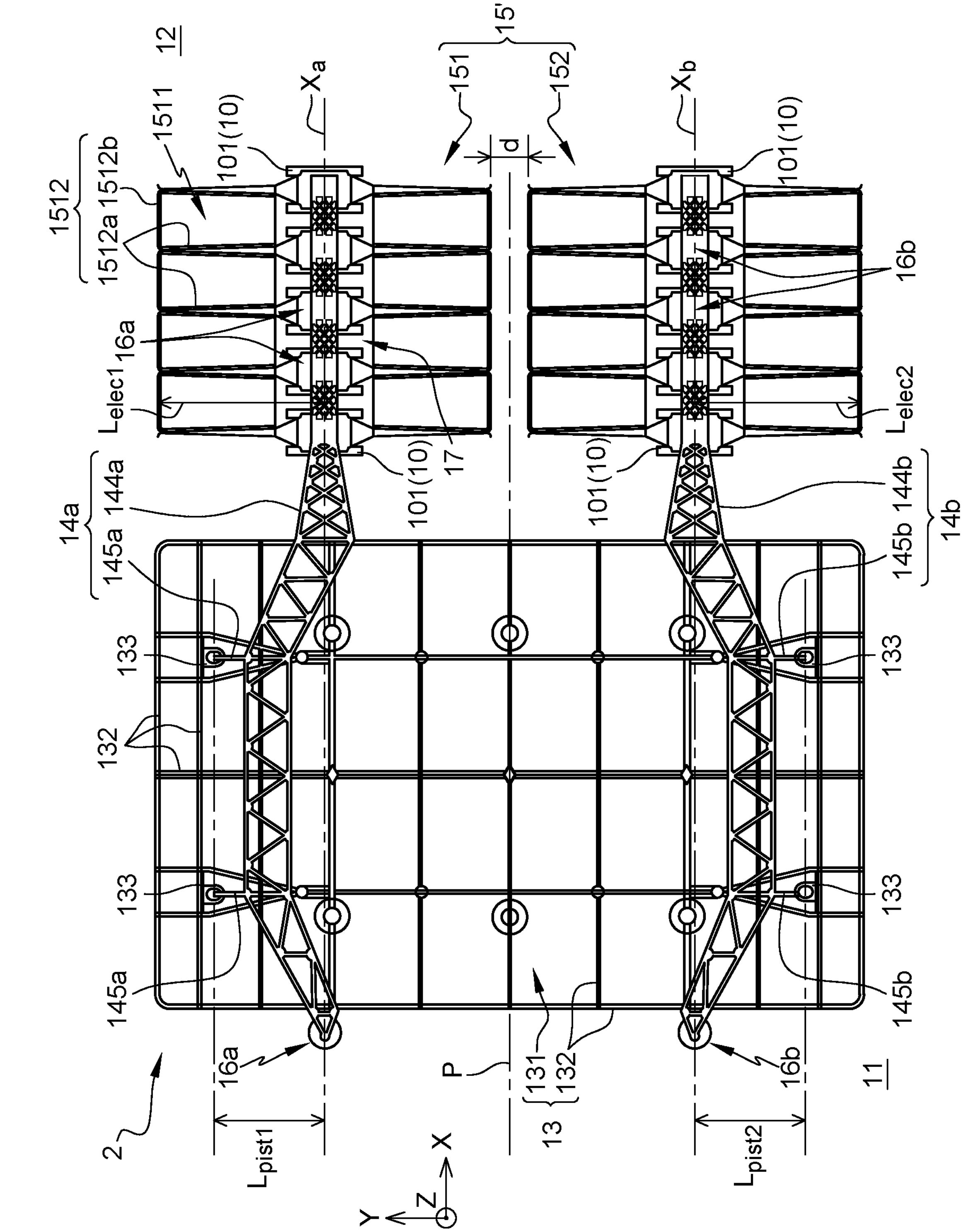
FIG. 2 is a partial bottom view of an electromechanical system according to a first embodiment of the invention, the electromechanical system comprising a capacitive detection or actuation system.
Figure 3:
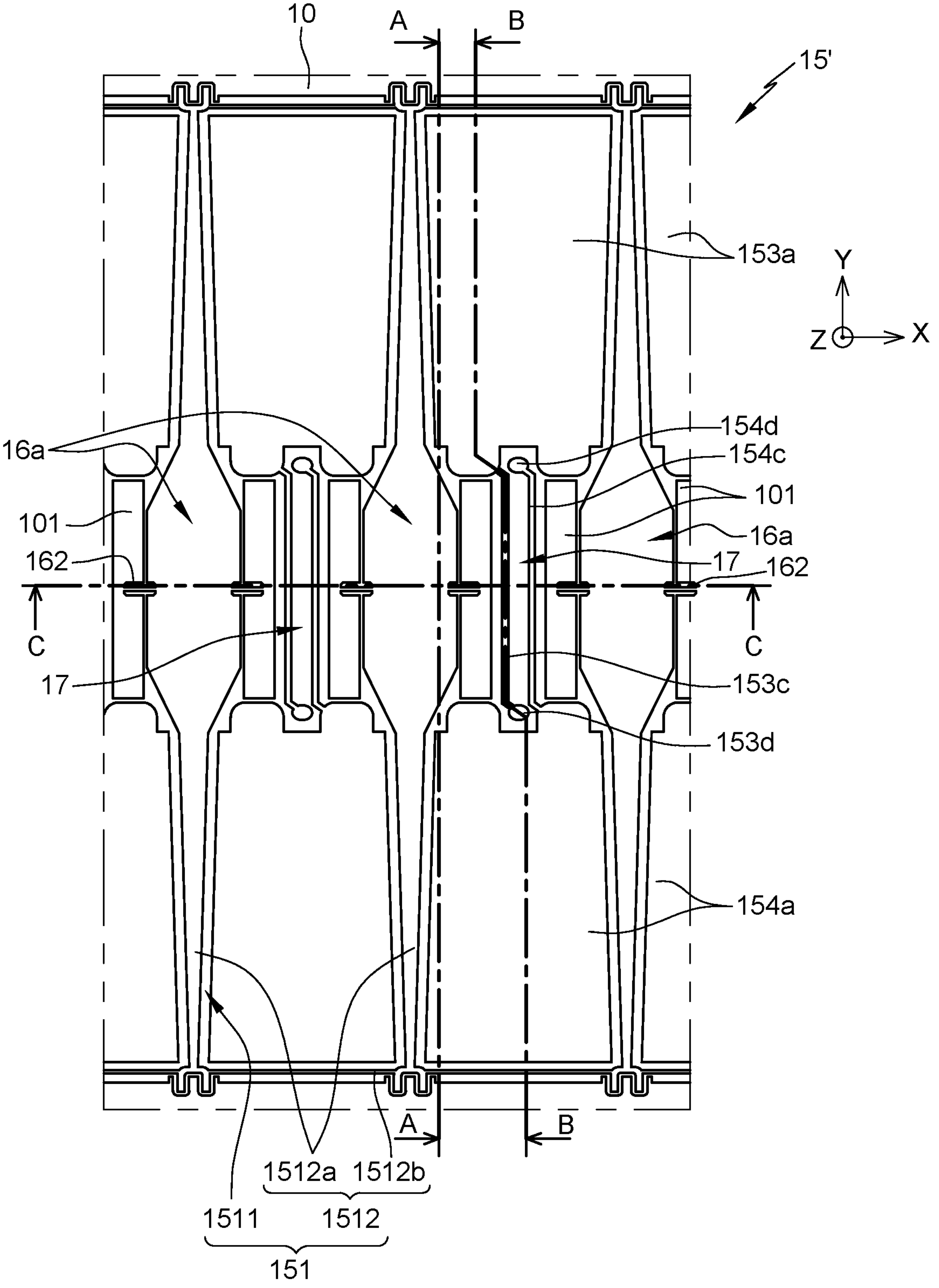
FIG. 3 is a partial top view of the capacitive detection or actuation system of the electromechanical system of FIG. 2.
Figure 4A:
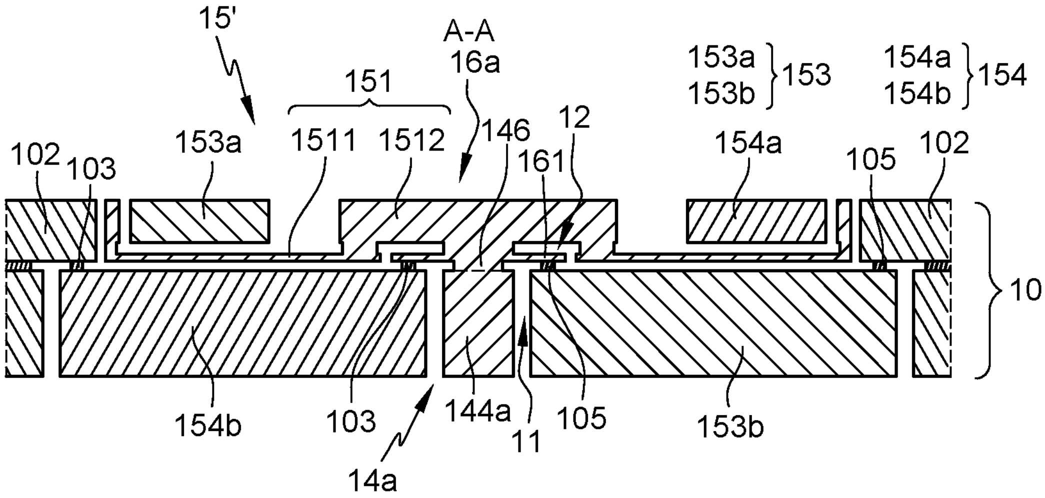
FIG. 4A is a cross-sectional view of the electromechanical system along sectional plane A-A of FIG. 3.
Figure 4B:
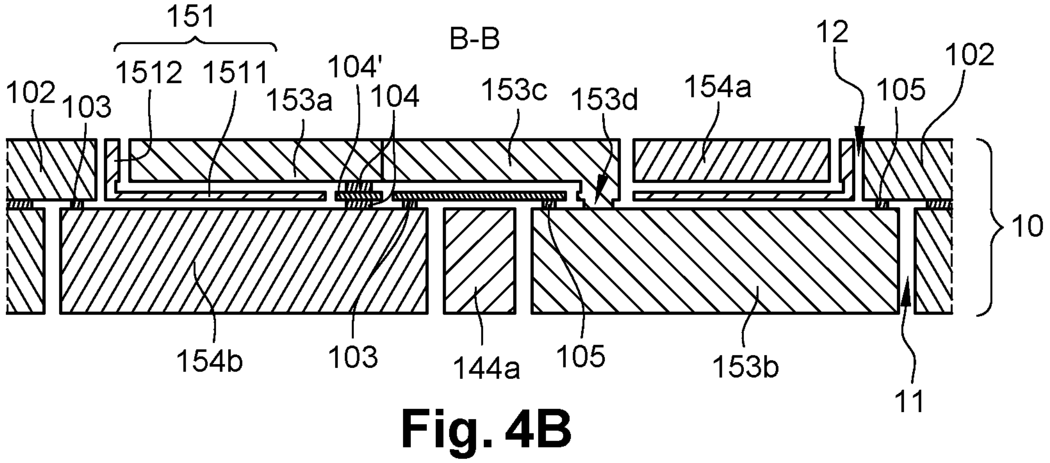
FIG. 4B is a cross-sectional view of the electromechanical system along sectional plane B-B of FIG. 3.
Figure 4C:
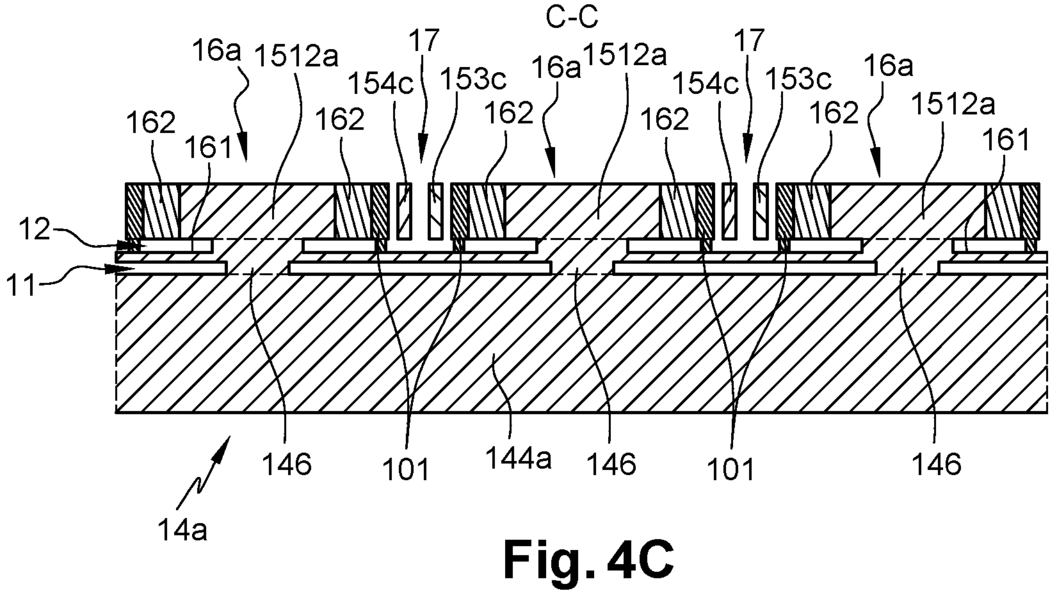
FIG. 4C is a cross-sectional view of the electromechanical system along sectional plane C-C of FIG. 3.

FIG. 2 is a bottom view of the electromechanical system 2 showing first portions 101 of the frame 10, the movable element 13, the transmission devices 14*a*-14*b* and the movable electrodes 151-152 of the capacitive detection system 15'. FIG. 3 is a top view showing only a part of the capacitive detection system 15' (including the first movable electrode 151). FIGS. 4A to 4C are different cross-sectional views of the electromechanical system 2, respectively along the cross-sectional planes A-A, B-B and C-C represented in FIG. 3. They partly represent the frame 10, the first transmission device 14*a* and the capacitive detection system 15'.

The movable element 13, hereinafter referred to as the piston, is translationally movable relative to the frame 10, along a direction (Z) perpendicularly to the plane (XY) of FIG. 2. In an embodiment, it comprises a membrane 131 and a structure 132 for rigidifying the membrane 131, also referred to as a skeleton or armature. The role of the membrane 131 of the piston 13 is here to collect over its entire surface a pressure difference between its two faces, in order to deduce a variation in atmospheric pressure therefrom.

The membrane 131 of the piston 13 can partly delimit a reference closed volume known as the reference volume, where a reference pressure prevails. It separates this reference volume from a cavity open to the external environment, in this case air. A face of the membrane 131 is therefore subjected to the reference pressure and an opposite face of the membrane 131 is subjected to the atmospheric pressure (the variation of which is to be detected in the case of a microphone). Alternatively, the reference volume may be quasi-closed, in the sense that there is a trench around the piston (which is trimmed). This trench allows the piston to move and allows air to leak between the reference volume and the outside. This leakage is small so that the pressures can equalise slowly, so that only low frequency (<100 Hz) pressure variations are filtered out.

The first zone 11 encompasses the cavity open to the external environment, subjected to atmospheric pressure, and the reference volume subjected to the reference pressure.

The capacitive detection system 15' makes it possible to measure displacement of the piston 13, and thus the difference in pressure between its two faces. Further to the first and second movable electrodes 151-152, they comprise at least one fixed electrode (with respect to the frame 10), separated from the first movable electrode 151 by a first dielectric medium, and at least one additional fixed electrode, separated from the second movable electrode 152 by a second dielectric medium.

Each movable electrode and associated fixed electrode(s) form the armatures of one or more capacitors whose capacitance varies as a function of the movement of the piston 13. The fixed electrodes may also be referred to as "counter electrodes".

The first dielectric medium and the second dielectric medium are not solid (but, in an embodiment, consist of a gas or a mixture of gases), so as not to impede movement of the movable electrodes 151. The second dielectric medium is here identical to the first dielectric medium, as the movable electrodes 151-152 are both located in the second zone 12.

The second zone 12 is beneficially a controlled atmosphere chamber to reduce the phenomena of viscous friction and acoustic noise associated therewith. By "controlled atmosphere chamber», it is meant a chamber under a reduced pressure, typically less than 10 mbar, and for example less than 1 mbar. Thus, the second zone 12 is subjected to a pressure much lower than atmospheric pressure or the reference pressure.

The first transmission device 14*a* is rotatably mounted with respect to the frame 10 by means of a plurality of first pivot hinges 16*a*. It comprises a first transmission shaft 144*a* and first transmission arms 145*a*.

The first transmission shaft 144*a* has a first longitudinal axis of rotation Xa (hereinafter referred to as first axis Xa), which extends in a first direction X. In other words, the first transmission shaft 144*a* can pivot on itself, about the first axis Xa. It extends facing the piston 13, facing a region between the piston 13 and the first movable electrode 151 and facing the first movable electrode 151.

The first movable electrode 151 is secured to the first transmission shaft 144*a*, which means that there is no relative movement between the first movable electrode 151 and the first transmission shaft 144*a*. The first movable electrode 151 is therefore also rotatably movably mounted about the first axis Xa.

The electromechanical system 2 is thus devoid of movement transformation elements between the first transmission device 14*a* and the first movable electrode 151, such as torsion blades for switching from rotation to translation. As a result, no energy is lost in these transformation elements (for example, by deformation of the torsion blades).

The first transmission arms 145*a*, for example two in number in FIG. 2, extend perpendicularly to the first axis Xa, in other words in a second direction Y perpendicular to the first direction X. The first and second directions X-Y together with a third perpendicular direction Z form an orthogonal coordinate system.

Each first transmission arm 145*a* comprises a first end coupled to the piston 13 and a second end secured to the first transmission shaft 144*a*. One or more coupling elements 133 (for example torsion blades) connect the rigidifying structure 132 of the piston 13 to the first end of each first transmission arm 145*a* and allow switching from a translational movement (piston 13) to a rotational movement (first transmission shaft 144*a* and first movable electrode 151) while strongly coupling their displacement along the third direction Z. These coupling elements 133 are capable of elastic deformation.

The translational movement of the piston 13 causes the first transmission arms 145*a*, and therefore the first transmission shaft 144*a*, to rotate about the first axis Xa. This rotational movement is then transmitted to the first movable electrode 151.

The first pivot hinges 16*a*, for example six in number, are aligned, here in the first direction X. In an embodiment, one of the first pivot hinges 16*a* is located at the end of the first transmission shaft 144*a* on the side of the piston 13 (that is opposite to the first movable electrode 151), while other first pivot hinges 16*a* are located on the side of the first movable electrode 151. As will be described in detail below, the first movable electrode 151 is, in an embodiment, connected to the first transmission shaft 144*a* at these other first pivot hinges 16*a*.

The second transmission device 14*b* is also rotatably mounted with respect to the frame 10 by means of second pivot hinges 16*b*. It is constructed in the same way as the first transmission device 14*a*. More particularly, it comprises a second transmission shaft 144*b* having a second longitudinal axis of rotation Xb (hereinafter referred to as the second axis Xb) and second transmission arms 145*b* (for example two). Each second transmission arm 145*b* comprises a first end coupled (via one or more coupling elements 133) to the piston 13 and a second end secured to the second transmission shaft 144*b*. The second transmission arms 145*b*, in an embodiment, extend perpendicularly to the second axis Xb.

The second movable electrode 152 is secured to the second transmission shaft 144*b* and therefore rotates about the second axis Xb.

The second pivot hinges 16*b* are, in an embodiment, distributed along the second axis Xb in the same way as the first pivot hinges 16*a* are distributed along the first axis Xa (one of them is located at the end of the second transmission shaft 144*b* and others are located at the second movable electrode 152).

The first transmission arms 145*a* are coupled to a first half of the piston 13 (the upper half in FIG. 2) and the second transmission arms 145*b* are coupled to a second half of the piston 13 (the lower half in FIG. 2). Thus, the transmission devices 14*a*-14*b* support the piston 13 and hold it in a translational movement. In an embodiment, the piston 13 is held only by the first and second transmission arms 145*a*-145*b*. Thus, a greater proportion of energy collected by the piston 13 is transmitted to the movable electrodes 151-152.

As is illustrated in FIG. 2, the first axis Xa and the second axis Xb are beneficially parallel to each other. This helps to reduce the overall size of the electromechanical system 2 and allows the piston to be supported evenly.

The first movable electrode 151 and the second movable electrode 152 may be identical and arranged symmetrically with respect to a plane P separating the first and second halves of the piston 13. This symmetry makes it possible to obtain an identical reaction on the two halves of the piston so that the latter is well held in translation.

The first transmission device 14*a* and the second transmission device 14*b* may also be symmetrical with respect to the plane P. The first transmission shaft 144*a* and the first movable electrode 151 then pivot in one direction (about the first axis Xa), while the second transmission shaft 144*b* and the second movable electrode 152 pivot in the opposite direction (about the second axis Xb).

The piston 13 may also be symmetrical relative to the plane P.

The symmetries of the piston 13 and the transmission devices 14*a*-14*b* allow energy collected by the piston 13 to be distributed equally between the first movable electrode 151 and the second movable electrode 152. Indeed, the mass of the piston 13 is distributed equally between the first and second halves, and thus between the first and second transmission devices 14*a*-14*b*.

Rotatable mounting of the first movable electrode 151 and the second movable electrode 152, respectively along the same axis of rotation as the first transmission device 14*a* and the second transmission device 14*b*, makes it possible to obtain a greater displacement of the movable electrodes 151-152 for a given displacement of the piston 13, without, however, increasing the overall size of the electromechanical system 2. Indeed, the length of the transmission shafts 144*a*-144*b* does not influence amplitude of the displacement of the movable electrodes 151-152. The movable electrodes 151-152 can therefore be brought as close as possible to the piston 13.

Switching from one movable electrode (FIG. 1) to two movable electrodes (FIG. 2) does not significantly increase overall size of the electromechanical system 2 either, as the two movable electrodes 151-152 can be disposed facing each other as an extension of the piston 13. The distance d between the movable electrodes 151-152 is for example between 10 μm and 100 μm.

The displacement of each movable electrode 151, 152 relative to that of the piston 13 is a function of the distance $L_{pist1}$, $L_{pist2}$ between the first end of the transmission shafts 145*a*, 145*b* and the corresponding axis of rotation Xa, Xb. This distance may be of the same order of magnitude as the distance $L_{elec1}$, $L_{elec2}$ between a longitudinal edge (that is along X) of the movable electrode 151, 152 and the axis of rotation Xa, Xb.

More precisely, the Z-displacement of the longitudinal edge of the first movable electrode 151 is given by the following relationship:

$$d_{Zelec1} = \frac{L_{elec1}}{L_{pist1}} \times d_{Zpist} \quad \text{[Math. 1]}$$

where $d_{zpist}$ is the Z-displacement of the piston 13 (and hence of all the first ends of the first and second transmission arms 145*a*-145*b*), $L_{elec1}$ is the distance between the longitudinal edge of the first movable electrode 151 and the first axis Xa and $L_{pist1}$ is the distance between the first end of each first transmission arm 145*a* and the first axis Xa.

The Z-displacement of the longitudinal edge of the second movable electrode 152 is given by the following relationship:

$$d_{Zelec2} = \frac{L_{elec2}}{L_{pist2}} \times d_{Zpist} \quad \text{[Math. 2]}$$

where $L_{elec2}$ is the distance between the longitudinal edge of the second movable electrode 152 and the second axis Xb and $L_{pist2}$ is the distance between the first end of each second transmission arm 14*b* and the second axis Xb.

In an embodiment, the distance $L_{pist1}$ between the first end of each first transmission arm 145*a* and the first axis Xa is such that:

$$\frac{1}{2} \times L_{elec1} \leq L_{pist1} \leq 2 \times l_{elec1} \quad \text{[Math. 3]}$$

and the distance $L_{pist2}$ between the first end of each second transmission arm 14*b* and the second axis Xb is such that:

$$\frac{1}{2} \times L_{elec2} \leq L_{pist2} \leq 2 \times L_{elec2} \quad \text{[Math. 4]}$$

The transmission shafts 144*a*-144*b* and the transmission arms 145*a*-145*b* may be particularly rigid, and therefore not very sensitive to deformations which are equivalent to energy losses. This rigidity of the transmission shafts 144*a*-144*b* and the transmission arms 145*a*-145*b* may in particular be conferred by a significant thickness (measured in the third Z direction), in an embodiment, between 5 μm and 800 μm, and for example between 50 μm and 200 μm. The transmission shafts 144*a*-144*b* and the transmission arms 145*a*-145*b* are beneficially formed by etching a silicon substrate. This substrate can be thinned to a thickness of between 50 μm and 200 μm. Alternatively, the first elements of the transmission device 14' are formed by an epitaxially grown layer with a thickness between 5 μm and 40 μm.

As the transmission shafts 144*a*-144*b* rotate on themselves, their inertia remains low and does not negatively impact resonant frequency of the electromechanical system 2. However, they can be perforated, as is illustrated in FIG. 2, to optimise their stiffness to inertia ratio. The transmission shafts 144*a*-144*b* are, in an embodiment, perforated at least in the portion facing the piston 13. This also limits damping with the piston 13 (so-called squeeze film damping phenomenon), which is a source of noise.

The width of the transmission arms 145*a*-145*b* (measured in the first direction X) is of the same order of magnitude as their thickness, in order to minimise their inertia. It is beneficially between 5 μm and 800 μm, in an embodiment between 50 μm and 200 μm.

As illustrated in FIG. 2, the transmission shafts 144*a*-144*b* may each comprise a portion that is off-centred from (and extends in parallel to) their axis of rotation Xa, Xb, to provide space for the rigidifying structure 132 for the piston 13. Part of the rigidifying structure 132 may indeed be located on the same side of the membrane 131 as the transmission shafts 144*a*-144*b* (and formed in the same silicon substrate). The remaining part of the rigidifying structure 132 is located on the opposite side of the membrane 131.

The capacitive detection system 15' will now be described in more detail, referring only to the first movable electrode 151 (connected to the first transmission device 14*a*). Nevertheless, this description applies mutatis mutandis to the second movable electrode 152 (connected to the second transmission device 14*b*), since it may be identical to the first electrode 151. Similarly, the description that will be made of the first pivot hinges 16*a* applies to the second pivot hinges 16*b*.

With reference to FIGS. 2 and 3, the first electrode 151 may comprise a membrane 1511 and a structure 1512 for rigidifying the membrane 1511. The rigidifying structure 1512 in an embodiment comprises a plurality of first beams 1512*a* extending in parallel to each other. It may further comprise second beams 1512*b* connecting the first beams 1512*a* at their ends.

The first beams 1512*a*, in an embodiment, extend in the second direction Y, beneficially from a first edge to a second opposite edge of the first movable electrode 151. They are beneficially evenly spaced from each other, to rigidify the membrane 1511 uniformly. The second beams 1512*b*, in an embodiment, extend in the first direction X (thus perpendicularly to the first beams 1512*a*).

The first movable electrode 151 beneficially has one or more planes of symmetry, for example a plane parallel to the plane XZ (thus perpendicular to the first beams 1512*a*) and another plane parallel to the plane YZ.

The rigidifying structure 1512 of the first movable electrode 151 is beneficially anchored, or fused, to the first transmission device 14*a* at a portion of the first pivot hinges 16*a*. Compared to the microphone 1 in FIG. 1, the electrostatic system 2 is thus devoid of the second transmission arms 142 extending into the second zone 12.

More particularly, the rigidifying structure 1512 of the first movable electrode 151 is connected to the first transmission device 14*a*, and more particularly to the first transmission shaft 144*a*, by pillars 146 visible in FIGS. 4A and 4C. The pillars 146 of the first transmission device 14*a* are similar to the transmission shafts 143 of FIG. 1, as they extend partly into the first zone 11 and partly into the second zone 12. Indeed, sealing between the first zone 11 and the second zone 12 is also performed at the first pivot hinges 16*a* associated with the first movable electrode 151.

The first transmission device 14*a* is thus reduced to first elements exclusively extending in the first zone 11 (the first transmission shaft 144*a* and the first transmission arms 145*a*) and to second elements (the pillars 146) which extend partly in the first zone 11 and partly in the second zone 12. This reduction of the first transmission device 14*a* makes it possible to limit energy losses. Especially, there are no more losses through deformation of the second transmission arms 142.

The electromechanical system 2 is particularly compact, as several functions, namely rotating the first transmission device 14*a*, sealing between the two zones 11-12 and connecting to the first movable electrode 151, are carried out in the same place.

Anchoring between the rigidifying structure 1512 and the first transmission device 14*a* is, in an embodiment, achieved by means of the first beams 1512*a*. At least some of these are fused to the first transmission device 14*a*, each at a corresponding first pivot hinge 16*a*. The anchoring point of each first beam 1512*a* is beneficially located at half its length. Thus, the axis of rotation of the first movable electrode 151 lies in one of the planes of symmetry of the first movable electrode 151 (the one perpendicular to the first beams 1512*a*). The length of the first beams 1512*a* is measured in the second direction Y, while their width is measured in the first direction X.

Each first beam 1512*a* fused to the first transmission device 14*a* beneficially has a width that decreases with the distance from the corresponding first pivot hinge 16*a*. In other words, the width of the first beams 1512*a* is maximum at the first pivot hinges 16*a*. Thus, the rigidifying structure 1512 is most rigid where it is most mechanically stressed, that is near the axis of rotation. This helps to reduce energy loss through deformation, limiting the negative impact on the inertia of the first movable electrode 151 and thus the resonant frequency of the electromechanical system 2.

In this first embodiment of the electromechanical system 2, each of the first beams 1512*a* of the rigidifying structure 1512 is fused to the first transmission device 14*a*. In other words, each first beam 1512*a* has an associated first pivot hinge 16*a*. The number of first pivot hinges 16*a* on the side of the first movable electrode 151 is therefore equal to the number of first beams 1512*a*. This arrangement makes it possible to create a space 17 between two successive first pivot hinges 16*a*.

The frame 10 may comprise, for each first pivot hinge 16*a*, two distinct first portions 101 disposed on either side of the first beam 1512*a* associated with the first pivot hinge. The first beam 1512*a* is, in an embodiment, connected to each of the first portions 101 of the frame 10 by a torsion blade 162 (see FIG. 3).

As is represented in FIGS. 3, 4A-4C, the capacitive detection system 15', in an embodiment, comprises two counter-electrodes 153-154 associated with the first movable electrode 151: a first so-called positive counter-electrode 153 and a second so-called negative counter-electrode 154. In an embodiment, at least one part of the membrane 1511 of the first movable electrode 151 is located between the two counter-electrodes 153-154 (see FIGS. 4A-4C). The first movable electrode 151 and the counter-electrodes 153-154 thus form the armatures of two capacitors whose capacitances vary in opposite directions. A differential measurement of the displacement of the piston 13 can thus be obtained. The surface areas of the counter-electrodes 153-154 facing the first movable electrode 151 are beneficially identical, by virtue of a symmetry of the first movable electrode 151 and of the counter-electrodes 153-154 with respect to the first pivot hinges 16*a* (the plane of symmetry is coincident with the sectional plane C-C).

Beneficially, each of the counter-electrodes 153, 154 comprises a first portion 153*a*, 154*a* and a second portion 153*b*, 154*b* located on either side of the membrane 1511 and either side of the first pivot hinges 16*a*. The first so-called upper portion 153*a*, 154*a*, and the second so-called lower portion 153*b*, 154*b* of a same counter-electrode are electrically connected to each other. This arrangement makes it possible to obtain a fully differential measurement, even if the distance between the membrane 1511 and the upper portions 153*a*-154*a* of the counter-electrodes (referred to as the upper gap) is different from the distance between the membrane 1511 and the lower portions 153*a*-154*a* of the counter-electrodes (lower gap).

The lower portions 153*b*-154*b* of the counter-electrodes 153-154 extend under the first beams 1512*a* of the rigidifying structure 1512, on either side of the first pivot hinges 16*a*. In contrast, the upper portions 153*a*-154*a* of the counter-electrodes 153-154 are, in an embodiment, each divided into a plurality of blocks (or sub-portions) separated by the first beams 1512*a*, as is illustrated in FIG. 3. As the upper portions 153*a*-154*a* of the counter-electrodes 153-154 are inscribed in the rigidifying structure 1512, their surface area facing the membrane 1511 is smaller than that of the lower portions 153*b*-154*b*.

Each block of the upper portion 153*a* of the first counter electrode 153 may be electrically connected to the lower portion 153*b* of this same counter electrode by a first connector 153*c* and a first conductive via 153*d*. Similarly, each block of the upper portion 154*a* of the second counter electrode 154 may be electrically connected to the lower portion 154*b* of this same counter electrode by a second connector 154*c* and a second conductive via 154*d*.

The first and second connectors 153*c*-154*c* beneficially extend into the space 17 located between two first pivot hinges 16*a*. Thus, the electrical connection of the upper and lower portions of a same counter electrode is simplified and does not increase the overall space of the capacitive detection system 15'.

Alternatively, the different blocks of an upper counter electrode portion may be directly connected to each other, for example at the periphery of the first movable electrode 151.

With reference to FIGS. 4A and 4B, the lower portions 153*b*-154*b* of the counter-electrodes 153-154 are, in an embodiment, secured to an annular portion 102 of the frame 10, located at the periphery of the first movable electrode 151, by means of annular seals 103, 105 made of an electrically insulating material (one annular seal per lower portion 153*b*, 154*b*). These annular seals 103, 105, for example made of silicon oxide, further ensure sealing between the first zone 11 and the second zone 12.

In addition, each of the blocks of the upper portions 153*a*, 154*a* of the counter-electrodes 153-154 may be secured to the underlying lower portion 154*b*, 153*b* by (at least) two electrically insulating pillars 104, in an embodiment, formed of the same material as that of the annular seals 103, 105. The pillars 104 may be separated in pairs by a residual layer 104' formed of the same material as that of the membrane 1511 of the first movable electrode 151, for example silicon. The thickness of the pillars 104 is then equal to the upper gap and the lower gap. Otherwise, there is only one "double" pillar, whose thickness is equal to the sum of the upper gap, the lower gap and the thickness of the membrane 1511. The pillar(s) 104 and the residual layer 104' reduce parasitic capacitances between the upper portions 153*a*, 154*a* and the lower portions 153*b*-154*b* of the counter electrodes.

Alternatively, the capacitive detection system 15' may comprise (for each movable electrode) only one (lower or upper) counter-electrode, two upper and lower counter-electrodes but located on one side of the pivot hinges 16 (pseudo-differential detection), or two lower or upper counter-electrodes located on either side of the pivot hinges 16 (differential detection).

As previously indicated, sealing between the first and second zones 11-12 of the electromechanical system 2 may be achieved at the first pivot hinges 16*a* located on the side of the first movable electrode 151. As illustrated in FIGS. 4A and 4C, each first pivot hinge 16*a* associated with the first movable electrode 151 comprises a sealing insulation element 161, capable of elastically deforming under the effect of the rotational displacement of the first transmission device 14*a*. The sealed insulation element 161 is, in an embodiment, in the form of a sealing membrane.

Each sealed insulation member 161 has, in an embodiment, an associated pillar 146 of the first transmission device 14*a* passing therethrough. The sealed insulation element 161 extends, for example, from the associated pillar 146 to the lower portions 153*b*-154*b* of the counter-electrodes 153-154 (see FIG. 4A) and to the first portions 101 of the frame 10 (see FIG. 4C), to which it is anchored by means of the annular seals 103, 105 of electrically insulating material.

Furthermore, each first pivot hinge 16*a* (associated with the first movable electrode 151) beneficially comprises two torsion blades 162 (one per first portion 101 of the frame 10). The torsion blades 162 are dimensioned so as to be able to be torsionally deformed and to allow rotation of the first transmission device 14*a* and of the first movable electrode 151, while limiting their translational movements, in particular along the third direction Z (so-called "out-of-plane" translation). The two torsion blades 162 connect the rigidifying structure 1512 of the first movable electrode 151 (fused to the pillar 146 of the first transmission device 14*a*) to the first portions 101 of the frame 10 (see also FIG. 4C). They are, in an embodiment, aligned and disposed diametrically opposite to the first beam 1512*a* associated with the first pivot hinge 16*a*.

The first pivot hinge 16*a* located at the end of the first transmission shaft 144*a* beneficially comprises a sealing insulation element 161 (such as in the form of a membrane) and two torsion blades 162, but does not participate in the sealing between the first and second zones 11-12 (being located only in the first zone 11).

The electromechanical system 2 comprises an elastic device connected to the first movable electrode 151 and configured to generate an elastic force that opposes the movement of the first movable electrode 151. The role of the elastic device is to counteract the pull-in phenomenon of the first movable electrode 151. Their stiffness influences pull-in voltage of the system, and therefore the ability to bias the first movable electrode 151, but also the energy losses.

The "anti-pull-in" elastic device (mechanically) connects the rigidifying structure 1512 of the first movable electrode 151 to the frame 10 and/or to elements secured to the frame, such as the counter-electrodes 153-154, possibly via the pillars 146 of the first transmission device 14*a*. Thus, the stiffness of the first transmission device 14*a* or the stiffness of the rigidifying structure 1511 itself are not considered as "anti-pull-in" elastic device.

The elastic "anti-pull-in" device here comprises the sealed insulation elements 161 and, if applicable, the torsion blades 162. In this way, the sealed insulation elements 161 and the torsion blades 162 fulfil several functions simultaneously.

The anti-pull-in elastic device is connected to the rigidifying structure 1512 where it is most rigid, namely at the first pivot hinges 16*a*. Thus, the stiffness of the anti-pull-in elastic device is not degraded by series elements of too low stiffness. This stiffness can also be easily controlled by adjusting the dimensions of the sealed insulation elements 161 and the torsion blades 162. The sealed insulation elements 161 can be defined by anisotropically etching a sacrificial layer (for example of $SiO_2$) and are made in a structural layer of controlled thickness. This type of etching allows good control of dimensions of the sealed insulation elements 161. As a result, the stiffness of the sealed insulation elements 161 has a low dispersion (mainly between different electromechanical systems manufactured on the same wafer or on different wafers).

The second movable electrode 152 is beneficially connected to the second transmission device 14*b* in the same way as the first movable electrode 151 is connected to the first transmission device 14*a*. Thus, the electromechanical system 2 also comprises "anti-pull-in" elastic device connected to the second movable electrode 152, this elastic device, in an embodiment, comprising the sealed insulating elements 161 and, where applicable, the torsion blades 162 of the second pivot hinges 16*b*.

The sealed insulation elements 161 and, if applicable, the torsion blades 162, beneficially constitute the only "anti-pull-in" device of the electromechanical system 2. Thus, the electromechanical system 2 is particularly compact.

Figure 5:
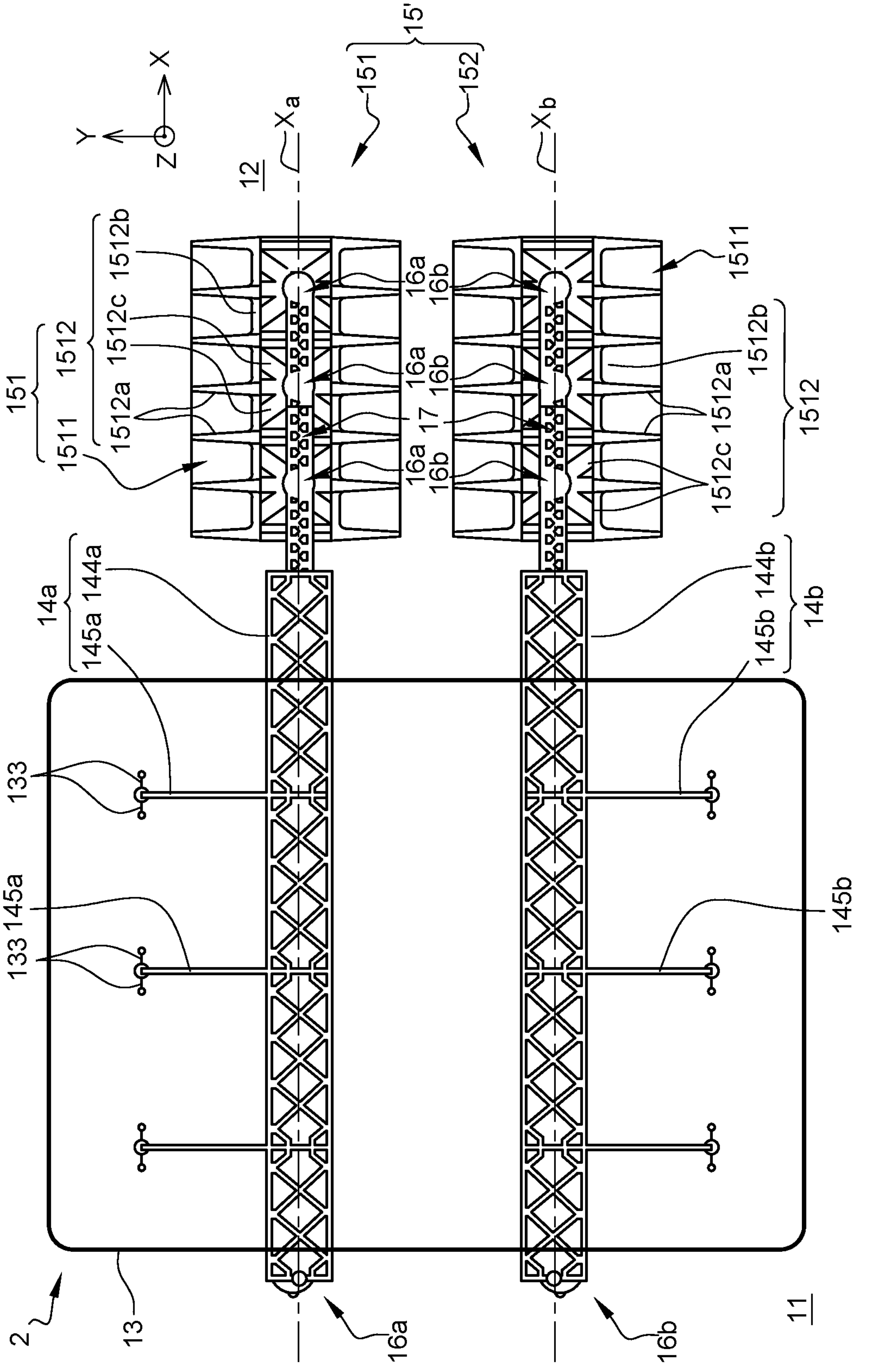
FIG. 5 is a partial bottom view of an electromechanical system according to a second embodiment of the invention.
Figure 6:
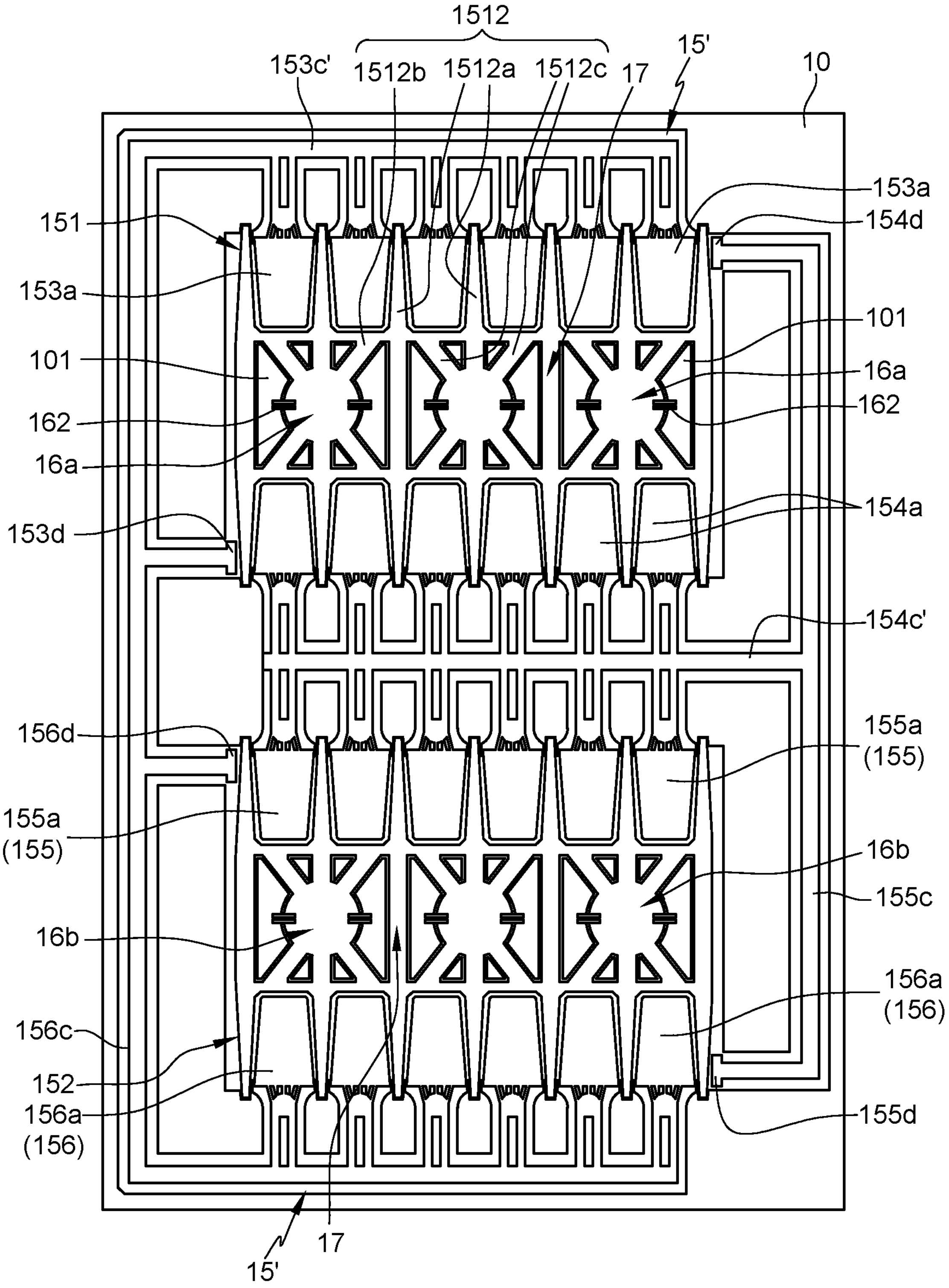
FIG. 6 is a top view of the capacitive detection or actuation system of the electromechanical system of FIG. 5.

FIGS. 5 and 6 represent a second embodiment of the electromechanical system 2. FIG. 5 is a bottom view of a part of the electromechanical system 2, similar to FIG. 2. The membrane and the piston rigidifying structure 13 are not represented. FIG. 6 is a top view, similar to FIG. 3, showing the capacitive detection system 15' (except for the lower portions of the counter-electrodes and the membranes of the movable electrodes below the counter-electrodes).

This second embodiment differs from the first embodiment in the design of the transmission devices 14*a*-14*b* and in the design of the capacitive detection system 15'. The pivot hinges 16*a*-16*b* are constructed as described in relation to FIGS. 4A-4C (sealed insulation elements and torsion blades 162).

The transmission shafts 14*a*-14*b* are here rectilinear. The number of first transmission arms 144*a* or second transmission arms 145*b* is equal to 3. They are, in an embodiment, evenly spaced.

The rigidifying structure 1512 of each movable electrode 151, 152 still comprises first beams 1512*a*, but more than the number of pivot hinges 16*a*, 16*b* used to anchor the movable electrode 151, 152. Thus, some first beams 1512*a* are not fused to the transmission device 14*a*, 14*b*. They extend over the lateral edges (along the second direction Y) of the movable electrode 151, 152 or between two successive pivot hinges 16*a*, 16*b*.

The second beams 1512*b* no longer connect the first beams 1512*a* at their ends, but closer to the pivot hinges 16*a*, 16*b*, for example halfway between the axis of rotation Xa, Xb (passing through the torsion blades 162; see FIG. 6) and the longitudinal edge of the movable electrode 151, 152.

In addition to increasing width of the first beams 1512*a* at the pivot hinges 16*a*, 16*b* (see FIG. 6), or alternatively, oblique beams 1512*c* are added to the first beams 1512*a* fused to the transmission device 14*a*, 14*b* to form cross braces, which further increase stiffness of the rigidifying structure 1512*a* at the pivot hinges 16 (where it is most stressed).

The space 17 between two successive hinges 16*a*, 16*b* is occupied by one or more first beams 1512*a* (not fused to the transmission device 14*a*, 14*b*), which necessitates a change in the way the upper and lower portions of the counter electrodes are connected.

FIG. 6 shows the first and second counter-electrodes 153-154 associated with the first movable electrode 151, and third and fourth counter-electrodes 155-156 associated with the second movable electrode 152. The third and fourth counter-electrodes 155-156 are beneficially arranged in the same way as the first and second counter-electrodes 153-154, in an embodiment, in the manner described in relation to FIGS. 3, 4A-4C. In particular, they each comprise an upper portion 155*a*, 156*a*, comprised of different blocks electrically connected to each other, and a lower portion (not visible in FIG. 6) connected to the upper portion.

The different blocks of the upper portion 153*a* of the first counter-electrode 153 are electrically connected to each other by a first conductive track 153*c*' which extends to the periphery of the first movable electrode 151. This first conductive track 153*c*', referred to as the outer track, bypasses the first movable electrode 151 up to the first conductive via 153*d* to connect to the lower portion of the first counter-electrode 153, located on the other side of the first pivot hinges 16*a*. Similarly, the different blocks of the upper portion 154*a* of the second counter electrode 154 are electrically connected to each other by a second conductive track 154*c*' which extends at the periphery of the first movable electrode 151 to the second conductive via 154*b*.

In an embodiment, the third counter-electrode 155 is electrically connected to the second counter-electrode 154 so as to be subjected to the same electrical potential. Beneficially, the different blocks of the upper portion 155*a* of the third counter-electrode 155 are connected to the different blocks of the upper portion 154*a* of the second counter-electrode 154 via the second conductive track 154*c*'. The blocks of the upper portion 155*a* of the third counter-electrode 155 are beneficially disposed facing the blocks of the upper portion 154*a* of the second counter-electrode 154. Additionally, a third conductive track 155*c* is connected to the second conductive track 154*c*' and bypasses the second movable electrode 152. This third conductive track 155*c* is connected to a third conductive via 155*d* in electrical contact with the lower portion of the third counter electrode 155.

The fourth counter-electrode 156 is, in an embodiment, electrically connected to the first counter-electrode 153 so as to be subjected to the same electrical potential. The different blocks of the upper portion 156*a* of the fourth counter-electrode 156 are beneficially connected to the different blocks of the upper portion 153*a* of the first counter-electrode 153 via the first conductive track 153*c*' and a fourth conductive track 156*c*. This fourth conductive track 156*c* bypasses the second movable electrode 152 and is connected to a fourth conductive via 156*d* in electrical contact with the lower portion of the fourth counter-electrode 156.

Electrical connections between the counter electrodes 153-156 are, in an embodiment, arranged symmetrically to minimise overall size of the capacitive detection system 15'.

The electromechanical system 2 described above can be manufactured using methods described in patents FR3059659B1 and FR3114584B1, especially starting from a stack of layers comprising successively a substrate, a first sacrificial layer and a first structural layer. The stack may in particular be a multilayer structure of the silicon-on-insulator (SOI) type, commonly called an SOI substrate.

The substrate is especially used to make, by etching, the first elements of the transmission devices 14*a*-14*b* (transmission shafts 144*a*-144*b* and transmission arms 145*a*-145*b*), the lower portions of the counter-electrodes 153-156 and a part of the frame 10. The substrate may be of a semiconductor material, for example silicon.

The first structural layer is used in particular to produce the membrane 131 of the piston 13, the membrane 1511 of the movable electrodes 151-152 and the sealed insulation elements 161 (sealing membranes). It has a thickness less than that of the substrate, in an embodiment, between 100 nm and 10 μm, for example equal to 1 μm. It is, in an embodiment, made of the same material as the substrate, for example silicon.

The first sacrificial layer is intended to disappear in part during the manufacture of the electromechanical system 2 in order to release the membrane 131 of the piston 13, the membrane 1511 of the movable electrodes 151-152 and the sealed insulation elements 161. Its thickness especially defines the distance between the membrane 1511 and the lower portions of the counter-electrodes 153-156 (lower gap). This layer also serves as a stop layer when etching the substrate, the membrane 152*a* and the second structural layer (the so-called "MEMS" layer described subsequently). The remaining parts of the first sacrificial layer form the annular seals 103, 105 and the lower pillars 104. The first sacrificial layer can be made of a dielectric material, in an embodiment, a silicon nitride or a silicon oxide, for example silicon dioxide ($SiO_2$). Its thickness is for example between 100 nm and 10 μm.

As described in the aforementioned patents, a second sacrificial layer is deposited onto the first structural layer and a second structural layer is formed on the second sacrificial layer, in an embodiment, by epitaxy.

The second structural layer is etched to define the rigidifying structure 132 of the piston 13, the rigidifying structure 1512 of the movable electrodes 151-152, the torsion blades 162, the upper portions of the counter-electrodes 153-156, the first portions 101 and the second annular portion 102 of the frame 10. Beneficially, it is formed by the same material as the first structural layer, for example silicon. The thickness of the second structural layer is, in an embodiment, between 5 μm and 50 μm, for example 20 μm.

The rigidifying structure 1512 of each movable electrode 151, 152 is fused to the corresponding transmission device 14*a*, 14*b* by growing the second structural layer directly from the substrate, at the location of the pivot hinges 16*a*, 16*b* (the first and second sacrificial layers have been opened beforehand). The pillars 146 of the transmission devices 14*a*, 14*b* are formed during this epitaxial growth.

The second sacrificial layer especially serves as a stop layer during etching of the second structural layer. It is partly removed to release the membrane 131 of the piston 13, the membrane 1511 of the movable electrodes 151-152 and the sealed insulation elements 161. Its thickness defines distance between the membrane 1511 and the upper portions of the counter-electrodes 153-156 (upper gap). The second sacrificial layer is beneficially formed by the same dielectric material as the first sacrificial layer, for example a silicon oxide. Its thickness may be between 100 nm and 10 μm.

The electromechanical system 2 does not necessarily comprise the two movable electrodes 151-152 and the two transmission devices 154*a*-154*b*. It may comprise a single movable electrode and a single transmission device (see FIGS. 7-9), or a single movable electrode and two transmission devices connected to this single movable electrode (see FIG. 10).

Figure 7:
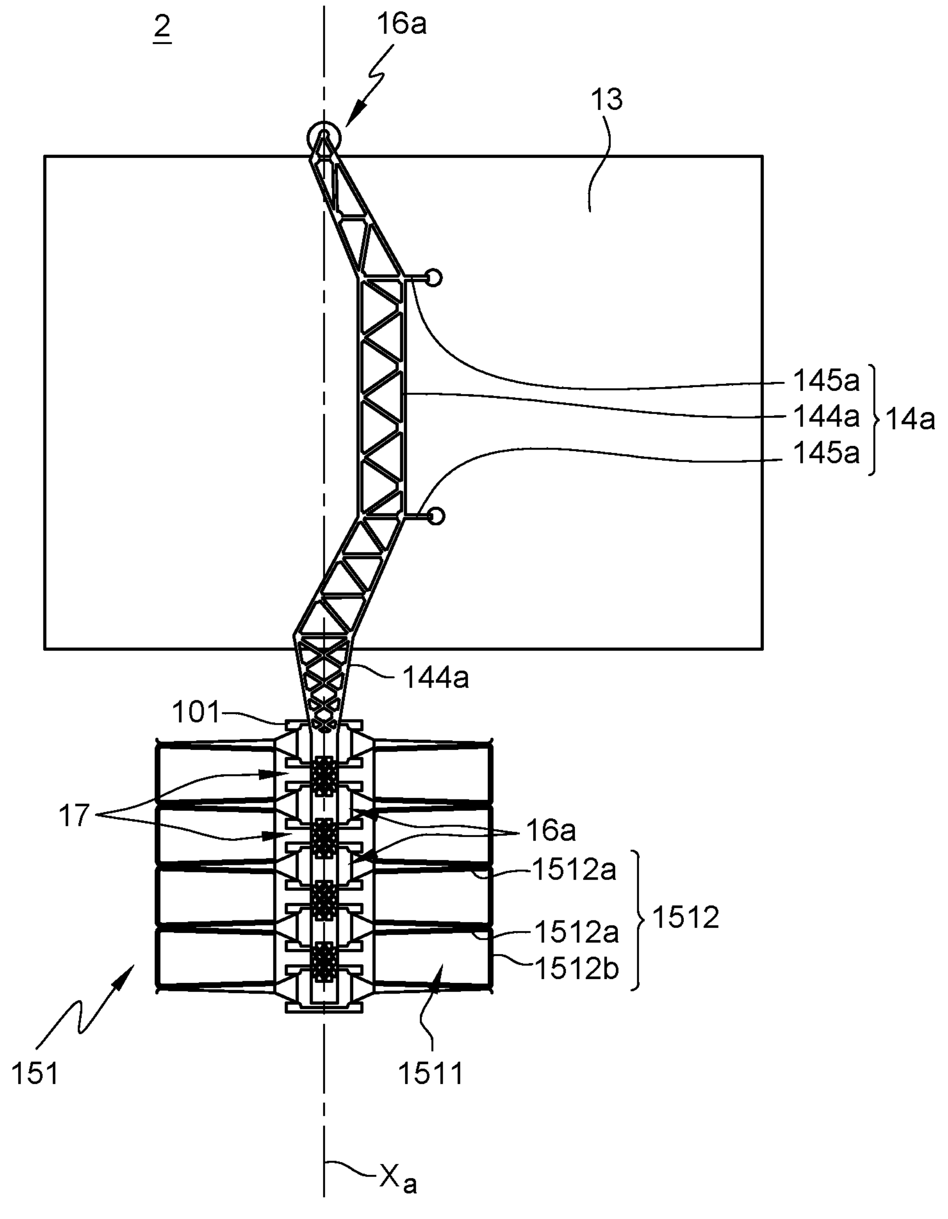
FIG. 7 is a partial bottom view of an electromechanical system according to a third embodiment of the invention.

FIG. 7 shows a third embodiment in which the electromechanical system 2 comprises, in addition to the piston 13, a single movable electrode 151 (for example of the type represented in FIG. 2) and a single transmission device 14*a* (for example of the type represented in FIG. 2).

Here the piston 13 is still translationally movable. It may be sufficiently balanced to be held in translation by the single transmission device 14*a*. The first ends of the transmission arms 145*a* of the transmission device 14*a* are, in an embodiment, coupled to the piston 13 at points on the centre line of the piston 13 (i.e. the line separating the two halves of the piston). Alternatively, the piston 13 may be guided in translation by means other than the single transmission device 14*a* (especially when it is not sufficiently well balanced).

Figure 8:
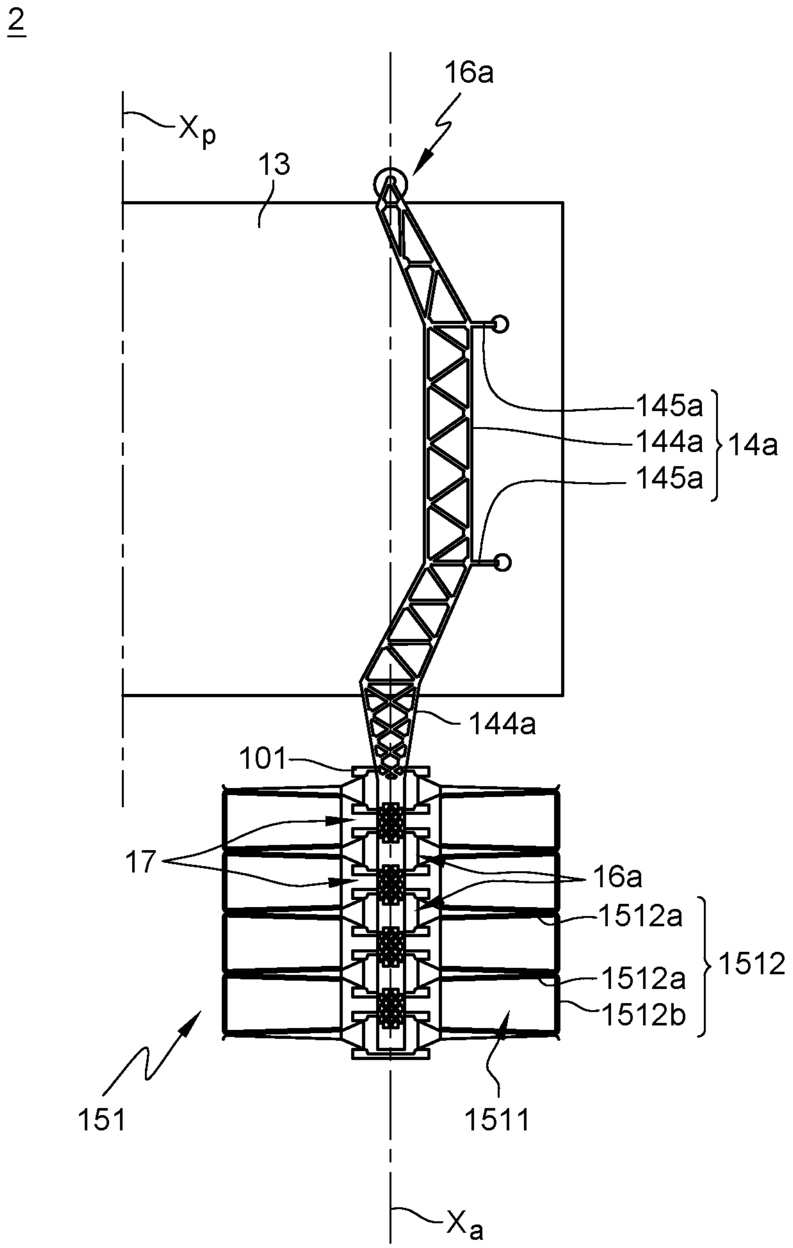
FIG. 8 is a partial bottom view of an electromechanical system according to a fourth embodiment of the invention.

In a fourth embodiment represented in FIG. 8, the electromechanical system 2 again comprises a single movable electrode 151 and a single transmission device 14*a*, but the piston 13 is rotatably (and not translationally) movable about an axis Xp, by means of pivot hinges or joints (not shown) distinct from the first pivot hinges 16*a*. The rotational movement of the piston 13 (about the axis Xp) rotatably drives the transmission shaft 144*a* of the transmission device 14*a* (about its own axis Xa), via the transmission arms 145*a*, and the transmission shaft 144*a* moves the movable electrode 151 (here in rotation about the axis Xa).

Figure 9:
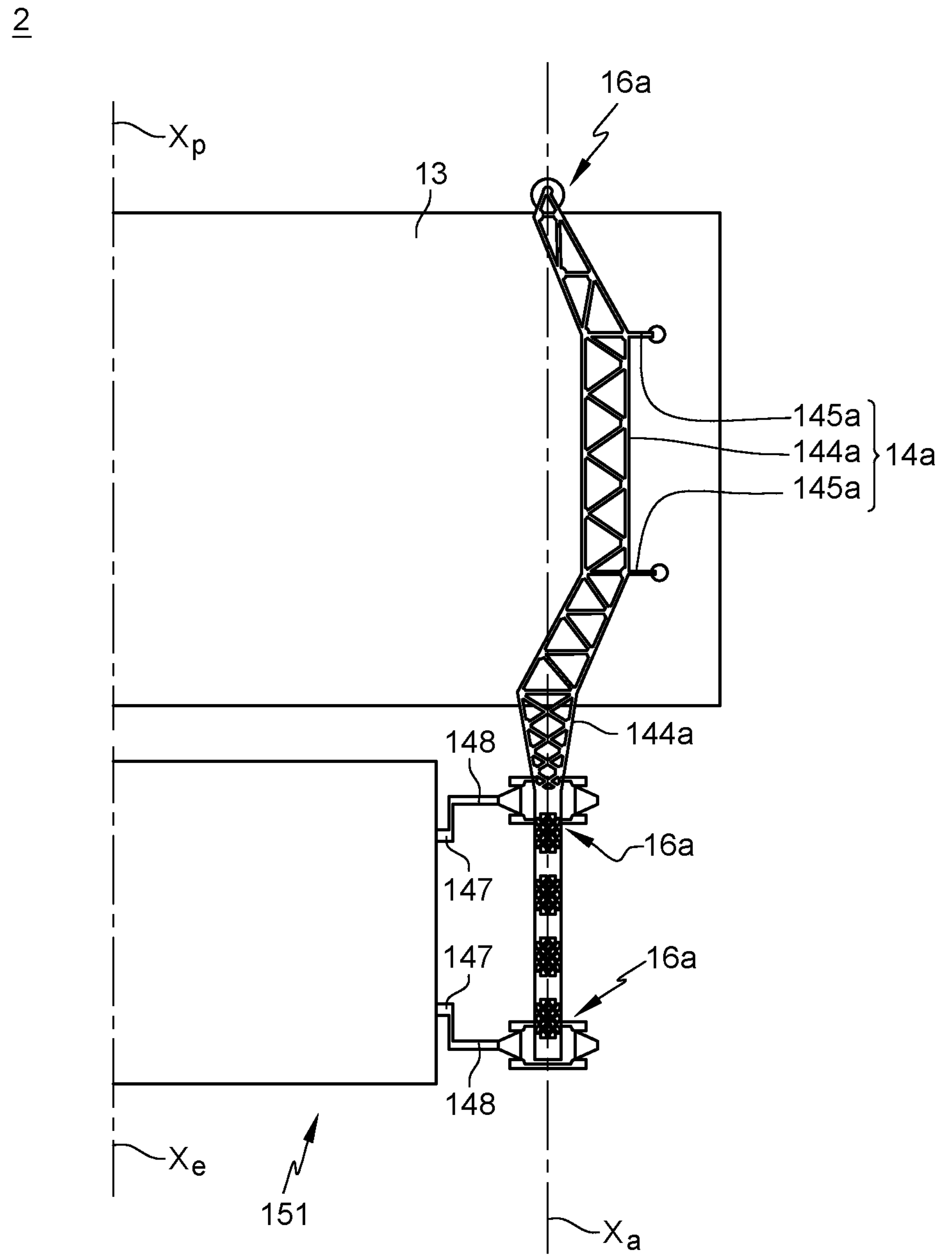
FIG. 9 is a partial bottom view of an electromechanical system according to a fifth embodiment of the invention.

FIG. 9 illustrates a fifth embodiment of the electromechanical system 2, which differs from the fourth embodiment in that the single movable electrode 151 rotates about an axis Xe distinct from the longitudinal axis of rotation Xa of the transmission shaft. The rotational movement of the movable electrode 151 is therefore not the same as the rotational movement of the transmission shaft 144*a*, which is also not the same as the rotational movement of the piston 13. The axis of rotation Xp of the piston 13 and the axis of rotation Xe of the movable electrode 151 are not necessarily coincident.

Thus, in this fifth embodiment (and in contrast to the previous embodiments), the movable electrode 151 is not integrally connected to the transmission shaft 144*a*, but via coupling elements 147 (for example torsion blades) allowing passage from one rotation to another rotation. These coupling elements 147 connect, for example, beams 148 (similar to the first beams 1512*a*) secured to the transmission shaft 144*a* to the rigidifying structure of the movable electrode 151.

Figure 10:
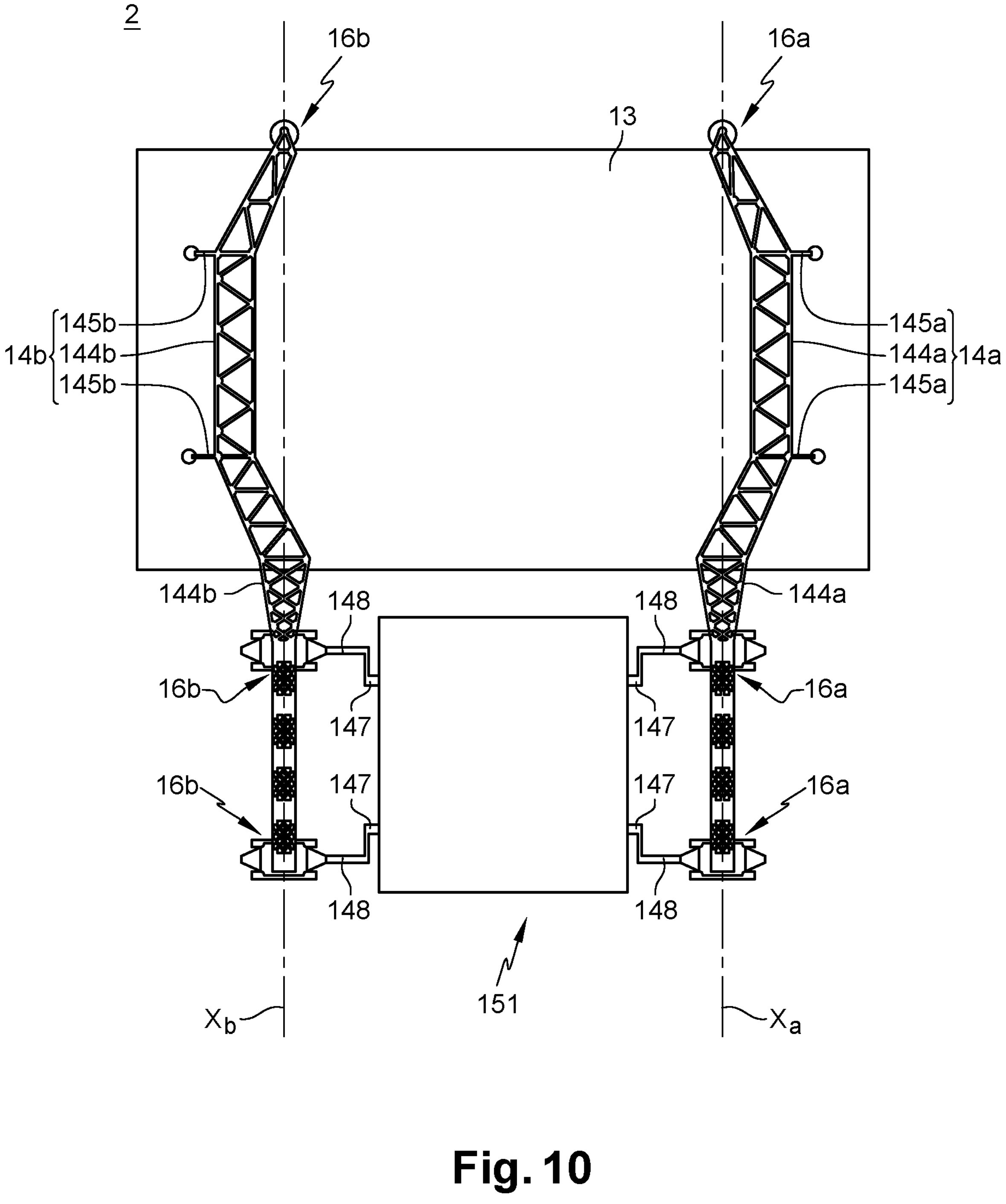
FIG. 10 is a partial bottom view of an electromechanical system according to a sixth embodiment of the invention.

In a sixth embodiment represented in FIG. 10, the electromechanical system 2 comprises only one movable electrode 151 but two transmission devices 14*a*-14*b* (for example those represented in FIG. 2). The piston 13 is translating (along Z), as in the first, second and third embodiments, and the movable electrode 151 is translating (along Z), rather than rotating. The transmission devices 14*a*-14*b* extend on either side of the movable electrode 151. The movable electrode 151 is connected to the transmission shaft 144*a*, 144*b* of each of the transmission devices 14*a*-14*b* via coupling elements 147 (for example torsion blades)

allowing passage from rotation to translation of beams 148. The two transmission shafts 144*a*-144*b* rotate in opposite directions, so as to raise or lower the movable electrode 151.

The electromechanical system 2 according to the invention is not limited to the embodiments described in connection with FIGS. 2 to 10 and many alternatives and modifications of the electromechanical system will become apparent to the skilled person.

The transmission shafts 144*a*-144*b* may adopt other geometries. The number of transmission arms 145*a*, 145*b* may be greater than 3.

The electromechanical system 2 may also comprise, for each transmission device 14*a*, 14*b*, one or more additional pivot hinges, not represented in the figures, between the one located at the end of the transmission shaft 144*a*, 144*b* and those connecting the movable electrode 151, 152. These additional pivot hinges are, in an embodiment, located in the first zone 11 and therefore do not participate in sealing between both zones.

Alternatively, it may have only two pivot hinges per transmission device 14*a*, 14*b*, one at the movable electrode 151, 152, the other at the end of the transmission shaft 144*a*, 144*b*.

The electromechanical system 2 has been described using as an example a capacitive detection microphone comprising a piston 13 with a membrane 131 subjected to atmospheric pressure on the one hand and a reference pressure on the other hand. However, the electromechanical system can form other types of capacitive detection transducer, such as a loudspeaker (sound emitter) or an ultrasonic emitter (which are electroacoustic transducers), or even a differential pressure sensor.

In the case of a differential pressure sensor, the first face of the membrane 131 is subjected to a first pressure (not necessarily atmospheric pressure) and the second face of the membrane 131 is subjected to a second pressure, different from the first pressure. The displacement of the membrane 131, under the effect of the pressure difference, is measured by the capacitive detection system 15'. The membrane 131 of the piston is fixed to the frame 10 so as to be sealed, and the rigidifying structure 132 of the piston is absent or reduced so as not to anchor it to the frame.

In the case of a loudspeaker or ultrasonic transmitter, a capacitive actuation system replaces the capacitive detection system 15'. The capacitive actuation system also comprise stwo movable electrodes and at least one counter-electrode per movable electrode. The movable electrodes are moved by an electrostatic force and this movement is transmitted by the transmission devices 14*a*, 14*b* to the piston 13. The movement of the membrane 131 of the piston 13 enables emission of a sound (or ultrasound).

The second zone 12 may comprise two controlled atmosphere chambers, one enclosing the first movable electrode 151, the other enclosing the second movable electrode 152.

The first and second sealingly insulated zones 11-12 are not necessarily subjected to different pressures. The first zone 11 may also be an aggressive environment and the movable electrodes of the capacitive (detection or actuation) system is placed in the second zone 12 to protect them from this aggressive environment (in addition to reducing viscous friction, and thus acoustic noise).

The electromechanical system 2 may even devoid of a sealing device between the first and second zones 11-12 (which amounts to considering only one zone). More particularly, the pivot hinges 16 may be devoid of a sealed insulation element 161. Indeed, the torsion blades 162 may suffice for the rotation of the transmission device 14' and as elastic "anti-pull-in" device.

The articles "a" and "an" may be employed in connection with various elements, components, processes or structures described herein. This is merely for convenience and to give a general sense of the compositions, processes or structures. Such a description includes "one or at least one" of the elements, components, processes or structures. Moreover, as used herein, the singular articles also include a description of a plurality of elements or components, unless it is apparent from a specific context that the plural is excluded.

It will be appreciated that the various embodiments and aspects of the inventions described previously are combinable according to any technically permissible combinations.

The invention claimed is:

1. An electromechanical system comprising:
a frame;
an element movable relative to the frame;
capacitive measurement or actuation system comprising:
a first electrode movable relative to the frame; and
at least one electrode fixed relative to the frame and separated from the first movable electrode by a first dielectric medium;
a first transmission device for transmitting movement between the movable element and the first movable electrode, the first transmission device being rotatably movable relative to the frame by a plurality of first pivot hinges;
wherein the first transmission device comprises:
a first transmission shaft having a first longitudinal axis of rotation; and
a plurality of first transmission arms, each of the first transmission arms comprising a first end coupled to the movable element and a second end secured to the first transmission shaft;
and wherein the first movable electrode is connected to the first transmission shaft.

2. The electromechanical system according to claim 1, wherein the first movable electrode is secured to the first transmission shaft, whereby the first movable electrode is rotatably mounted about the first longitudinal axis of rotation.

3. The electromechanical system according to claim 1, wherein the capacitive measurement or actuation system further comprises:
a second electrode movable relative to the frame; and
at least one additional electrode fixed relative to the frame and separated from the second movable electrode by a second dielectric medium;
the system further comprising a second transmission device for transmitting movement between the movable element and the second movable electrode, the second transmission device being rotatably movable relative to the frame by a plurality of second pivot hinges and comprising:
a second transmission shaft having a second longitudinal axis of rotation; and
a plurality of second transmission arms, each of the second transmission arms comprising a first end coupled to the movable element and a second end secured to the second transmission shaft,
wherein the second movable electrode is connected to the second transmission shaft.

4. The electromechanical system according to claim 3, wherein the second movable electrode is secured to the second transmission shaft, whereby the second movable electrode is rotatably movably mounted about the second longitudinal axis of rotation.

5. The electromechanical system according to claim 3, wherein the first longitudinal axis of rotation is parallel to the second longitudinal axis of rotation.

6. The electromechanical system according to claim 3, wherein the first end of the first transmission arms is coupled to a first half of the movable element and wherein the first end of the second transmission arms is coupled to a second half of the movable element.

7. The electromechanical system according to claim 6, wherein the first movable electrode and the second movable electrode are symmetrical with respect to a plane separating the first and second halves of the movable element.

8. The electromechanical system according to claim 7, wherein the first transmission device and the second transmission device are symmetrical with respect to the plane separating the first and second halves of the movable element.

9. The electromechanical system according to claim 1, wherein at least one of the first pivot hinges is located at the first movable electrode and another of the first pivot hinges is located at an end of the first transmission shaft, opposite to the first movable electrode.

10. The electromechanical system according to claim 1, wherein the first transmission arms extend perpendicularly to the first longitudinal axis of rotation.

11. The electromechanical system according to claim 1, wherein the first end of each first transmission arm is located at a distance $L_{pist1}$ from the first longitudinal axis of rotation (Xa) such that:

$$\frac{1}{2} \times L_{elec1} \leq L_{pist1} \leq 2 \times L_{elec1}$$

where $L_{elec1}$ is the distance between a longitudinal edge of the first movable electrode and the first longitudinal axis of rotation.

12. The electromechanical system according to claim 1, wherein at least one part of the first transmission shaft located facing the movable element is perforated.

13. The electromechanical system according to claim 1, wherein the movable element is in contact with a first zone and the first movable electrode is located in a second zone sealingly insulated from the first zone.

14. The electromechanical system according to claim 13, wherein the first transmission shaft and the first transmission arms extend into the first zone and wherein the first transmission device further comprises pillars extending partly into the first zone and partly into the second zone.

15. The electromechanical system according to claim 1, wherein the first transmission shaft and the first transmission arms have a thickness between 5 μm and 800 μm.

16. The electromechanical system according to claim 15, wherein the first transmission shaft and the first transmission arms have a thickness between 50 μm and 200 μm.

17. The electromechanical system according to claim 1, wherein:

the first movable electrode comprises a membrane and a membrane rigidifying structure;

the rigidifying structure of the first movable electrode is anchored to the first transmission device at a part of the first pivot hinges.

18. The electromechanical system according to claim 17, wherein the rigidifying structure of the first movable electrode comprises a plurality of beams extending in parallel to each other and wherein at least one part of the beams are anchored to the first transmission device, each beam of said at least one part being anchored to a first pivot hinge corresponding to said beam.

19. The electromechanical system according to claim 1, wherein the capacitive measurement or actuation system comprises first and second fixed electrodes associated with the first movable electrode, the first movable electrode comprising a membrane disposed between the first and second fixed electrodes.

* * * * *